United States Patent [19]

Smith, III et al.

[11] Patent Number: 5,050,990

[45] Date of Patent: Sep. 24, 1991

[54] VARIABLE DETECTOR GEOMETRY FOR RESOLVING AND SENSING APPARATUS FOR FILTERING AND OTHER APPLICATIONS

[75] Inventors: Z. Erol Smith, III; Robert A. Street, both of Palo Alto, Calif.

[73] Assignee: Xerox Corporation, Stamford, Conn.

[21] Appl. No.: 572,918

[22] Filed: Aug. 24, 1990

[51] Int. Cl.$^5$ ............................ G01J 3/14; G01J 3/50
[52] U.S. Cl. .................................. 356/326; 250/226;
356/405; 358/75; 359/615
[58] Field of Search ............... 356/300, 326, 328, 402,
356/405, 406; 250/226; 358/75; 350/168, 96.11, 96.19

[56] References Cited

U.S. PATENT DOCUMENTS

| | | | |
|---|---|---|---|
| 4,375,649 | 3/1983 | Mir et al. | 358/75 |
| 4,547,074 | 10/1985 | Hinoda et al. | 356/405 |
| 4,580,889 | 4/1986 | Hiranuma et al. | 355/4 |
| 4,709,114 | 11/1987 | Vincent | 250/226 |
| 4,734,760 | 3/1988 | Futaki | 358/75 |
| 4,746,934 | 5/1988 | Schoening | 346/110 |
| 4,748,680 | 5/1988 | Margolin | 382/65 |
| 4,786,964 | 11/1988 | Plummer et al. | 358/44 |
| 4,822,998 | 4/1989 | Yokota et al. | 250/226 |

FOREIGN PATENT DOCUMENTS 255629 10/1988 Japan .................................. 356/406

OTHER PUBLICATIONS

Butera, *IBM Technical Disclosure Bulletin*, vol. 12, No. 11 Apr. 1970, p. 1828.
Reynolds, *IBM Technical Disclosure Bulletin*, vol. 12, No. 11 Apr. 1970, pp. 1960-1961.
Pedrotti, F. L., and L. S. Pedrotti, *Introduction to Optics*, Prentice Hall, 1987, pp. 419-422.
Kogata Sensor Kaihatsu, Publisher and Date Unknown, Source-Inventor, pp. 37-40. (Further information may be provided if required).
Wyszecki, Gunter and W. S. Stiles, *Color Science*, Second Ed., John Wiley & Sons, 1982, pp. 130-143.

*Primary Examiner*—F. L. Evans
*Attorney, Agent, or Firm*—Jonathan A. Small

[57] ABSTRACT

An image sensing apparatus of the type employing resolving and sensing means is provided with sensing means of selected size and geometry to allow approximation of arbitrary filter response. The sensing means of selected size and geometry may be incorporated into compact, self contained image resolving and sensing apparatus having a transparent substrate for resolving an incident image by refraction, diffraction or other suitable mechanism. The sensing means may be located directly on a surface of the transparent substrate. Logic and select circuitry may be integrally and simultaneously formed with the sensing means. The size and geometry of the sensing means may enable approximation to color inhibition and other effects to allow approximation of the spectral response of the human eye.

7 Claims, 5 Drawing Sheets

Geometric layout                                Sensitivity curves

Geometric layout | Sensitivity curves

VARIABLE DETECTOR GEOMETRY FOR RESOLVING AND SENSING APPARATUS FOR FILTERING AND OTHER APPLICATIONS

CROSS REFERENCE TO RELATED APPLICATIONS

This application is related to the subject matter of a Patent Application filed Mar. 30, 1990, Ser. No. 07/502,473 entitled SPECTRAL RESOLVING AND SENSING APPARATUS, assigned to the same assignee herein and incorporated by reference thereto.

BACKGROUND OF THE INVENTION

The present invention relates generally to sensing and detecting apparatus, and more specifically to arrangements of sensing elements of varying geometry and position for detecting selected groups of spectral components such as colors, typically used in scanners, electronic cameras, detectors, and the like.

Resolving an electromagnetic signal, for example light, into its constituent wavelengths, for example colors, is well known. Typical apparatus for doing so include prisms, diffraction gratings, thin films, etc., and many applications have been made of the ability to resolve such signals into their constituent parts. Electronic imaging, filtering, and object recognition are several of the more common applications. Electronic imaging applications are of primary concern herein, including those that operate primarily in the visible light region of the electromagnetic spectrum, and those that operate primarily outside that region. (For purposes of the present application "spectral" means both visible and nonvisible regions of the electromagnetic spectrum.) Electronic imaging applications operating primarily in the visible light region include, for example, video cameras, facsimile machines, electronic copiers, etc. Electronic imaging applications operating primarily outside the visible light region include infrared (IR) or ultraviolet (UV) detectors, spectrum analyzers, etc. The aim of these electronic imaging applications in general is to convert an electromagnetic signal (hereafter referred to as a "source image") into a machine manipulable data representation thereof.

Apparatus for producing machine manipulable data representations of a color source image include means for performing at least two functions: first, filtering or resolving the source image and second, detecting selected portions of the resolved source image. Heretofore, these functions have been performed by separate means. For example, U.S. Pat. No. 4,786,964 to Plummer et al. discloses an electronic imaging apparatus including separate filtering means and detector means. Multicolor striped or mosaic optical filters filter all but selected spectral components of the source image. Typically, 3 different color filters are employed to distinguish the primary colors. For an additive process, red, green, and blue are commonly used. For a subtractive process, yellow, green, and cyan are preferred. Although not specified, these filters are typically gelatin filters (such as dye inside a polyimide coating) as known in the art. These filters are placed over a plurality of charge coupled devices (CCDs) which detect the intensity of the light transmitted by each filter.

The general assembly and operation of the apparatus according to Plummer et al. is representative of the state of the art of color electronic imaging. The device of Plummer et al. happens to be a camera, although other references such as U.S. Pat. No. 4,734,760 to Futaki and U.S. Pat. No. 4,580,889 to Hiranuma et al. disclose other applications of similar operation. In a majority of these applications, however, filtering means, as opposed to resolving means, are used to separate the spectral components of the source image. The importance of this distinction is that filtering means reduce the available image intensity as a function of the number of components to be detected, whereas resolving means allow utilization of the maximum image intensity available, regardless of the number of components to be detected.

One variation on the above involves use of multiple light sources of different color to illuminate an object such as a color document. Light will be reflected by the object in regions of similar color to the source, and absorbed otherwise to produce a source image. Sensors such as the above-mentioned CCDs, photodiodes, or the like may then be used to detect the extent of reflection for each light source color, and by additive or subtractive processes the color composition of the object may be approximated.

Another variation on the above general assembly and operation is disclosed in U.S. Pat. No. 4,709,114 to Vincent. A color source image is caused to be incident upon a stack of dichroic plates which are reflective to selected colors and transmissive to all others. Sensors are positioned such that selected reflected color components of the source image, reflected by one plate of the stack, are individually detected. Alignment of the sensors is crucial in this arrangement in order to distinguish the sensing of individual colors.

Yet another variation of the above-described general embodiment is disclosed in U.S. Pat. No. 4,822,998 to Yokota et al. The filtering means disclosed in Yokota et al. comprises a silicon dioxide body formed to have areas of step-wise increasing thickness to define discrete filtering elements which form a set of interference filters. The greater the thickness of the filtering elements, the longer the first-order transmission wavelength. The sensing means disclosed in Yokota et al. are arrays of photodiodes mounted or formed on the surface of a substrate. These photodiodes may be provided with different sensitivities to operate in conjunction with the filtering elements for sensing selected color components. The geometry (i.e., planar aspect) of the photodiodes corresponds to the geometry of the filtering elements. The interference filter is mounted in either touching or spaced apart relationship to the photodiode arrays such that transmission by each element is caused to be incident upon a photodiode.

Each of the devices of the prior art have shortcomings and disadvantages which have been addressed by the present invention. One problem common to all the above-mentioned apparatus is that any compensation for the wavelength dependence of the sensitivity of the material from which the sensors are formed is performed remote of the sensors themselves. That is, compensation is usually performed in processing the output signals from the sensors. This adds complexity to the processing of such signals. It also generally implies added circuitry to implement the compensation.

Related to this, the prior art has heretofore been unable to provide any shaping of the sensitivity curves (i.e., transformations and filtering) of the responses of the sensors other than processing of the output signals of the sensors. Again, this adds complexity and hardware to the processing of such signals.

Furthermore, any filtering performed by the prior art has been by the interposing of physical filtering means between the image source and the detecting means. The result of this limitation is that much of the light intensity of a given wavelength is not delivered to the sensor intended to sense that wavelength; on the contrary, most of the light intensity of a given wavelength is wasted. Transmission filters such as gelatin films filter light by transmitting certain colors of light and absorbing all others. Gelatin film transmission efficiency is at best on the order of 50% in the range of colors they are designed to transmit. Furthermore, in order to filter a color source image into a number of components, say N discrete components (N is commonly referred to as the number of bins the source is divided into), there will be at least N filters. Some portion of the source image must fall on each of the filters (i.e., into each bin). If evenly distributed, there will be at best 1/N times the intensity of the source image falling on each filter. Once filtered, there will be at best 50% of this amount falling on the sensing means. The dichroic filters and interference filters have a much higher transmission efficiency than gelatin filters, however, they must also divide the source image N times (into N bins), where N is the number of components to be detected, thus reducing available image intensity by a factor of N.

In addition, the effect of such filters is generally to pass only a single spectral component or a group of adjacent spectral components (i.e., two or more components of the electromagnetic spectrum whose wavelengths are numerically adjacent one another within the resolution of the filtering and sensing means). It has not been possible to tailor such filters to pass arbitrary selected groups of spectral components for detection.

Another problem not addressed by the prior art is the presently unfilled need for an integral filtering and sensing means. In each of the prior art devices, the filtering elements and the sensing elements are formed separately, then joined. It is therefore desireable to provide an apparatus having sensing means formed directly on, or integrated into, the filtering means.

The realization or discovery of these problems and their solution each form various aspects of the present invention, as described further below.

SUMMARY OF THE INVENTION

One consequence of the ability to resolve a source image into a continuous spectral distribution (i.e., transform the source image from a frequency domain to a spatial domain) is the ability to sense the intensity of selected components or groups of components of the source image by selective placement of sensing means. However, it has been discovered that by varying the geometry and interconnection of the various sensors, arbitrary filter responses may be synthesized.

The present invention provides novel detector geometry, positioning, and interconnection for sensing the spectral content of an image and filtering or compensating as appropriate, which overcome a number of problems and shortcomings of the prior art. Devices built according to the present invention are particularly well suited for integration into scanning devices, especially color scanning devices, electronic cameras, detectors and other electronic imaging applications.

The present invention is best suited for applications providing continuous resolution of a source image, such as a prism, diffraction grating, thin film or the like. These resolving apparatus may be physically and conceptually remote from the sensing means, or may be integrated therewith as disclosed in the aforementioned patent application entitled Spectral Resolving and Sensing Apparatus. For the purposes of explanation of the present invention it will be assumed that the sensors are integral with the resolving means in the manner described in the said related patent application. By forming the sensing means directly on a substrate capable of acting as a resolving means, an integral resolving and sensing apparatus is obtained. This leads to certain advantages including the ability to produce a compact resolving and sensing apparatus, the ability to produce a device having self-aligned resolving and sensing means, the ability to produce a device whose efficiency is independent of the number of wavelength components sensed, and others. However, it will be appreciated that the present invention may find applicability in other environments, such as remote filtering or resolving means, noncontinuous filtering or resolving means, etc., without departing from its spirit and scope.

According to one embodiment of the present invention, one or more sensors, such as solid state photodetectors, are formed on a suitable substrate. These sensors are formed so as to have a primary surface. These sensors are of a type whose output signal is proportional to the number of photons incident upon said primary surface.

According to this embodiment of the present invention, the substrate is transparent and is provided with a beveled side such that light entering the substrate from that beveled side is refracted within the substrate. This refraction separates the individual wavelength components of the incident light such that they strike the substrate at a side adjacent the beveled side at spatially separated locations. The above-mentioned sensors are formed on said adjacent side, spaced apart from one another so as to be able to detect selected wavelength components or groups of wavelength components striking that side. Logic and select circuitry may be formed by similar processes as, and generally simultaneously on the substrate with the processes forming the sensors, and are used to determine the level of the wavelength components or groups of wavelength components impinging upon the sensors. Embodiments operating either within or without the visible light region may be realized.

Various embodiments of the present invention include photodetectors acting as diodes in a circuit in which they may be included. This arrangement is appropriate when the desired response of the detectors is a signal proportional to the spectral energy impinging the detectors. However, in certain circumstances, such as modeling the CIE response of the human eye, it is necessary to include the effects of color inhibition. In order to do so, an embodiment of the present invention includes positioned photodetectors that contribute current resistance as function of incident spectral energy.

The scope of the present invention, including further embodiments and the manner in which it addresses the problems associated with prior art, will become more readily apparent from the following detailed description when taken in conjunction with the accompanying drawings and claims.

DETAILED DESCRIPTION

Variable detector geometry for resolving and sensing apparatus for filtering and other applications employing the aspects listed above, as well as others, will now be described. The following description will be primarily in terms of an embodiment particularly well suited to a color scanning apparatus, with other embodiments discussed where appropriate. It will be appreciated, however, that the spirit and scope of the present invention encompass many other embodiments and applications. Thus, the following description is limited only for the purposes of clarity, and should not be read as limiting the scope of the present invention.

Figure 1:
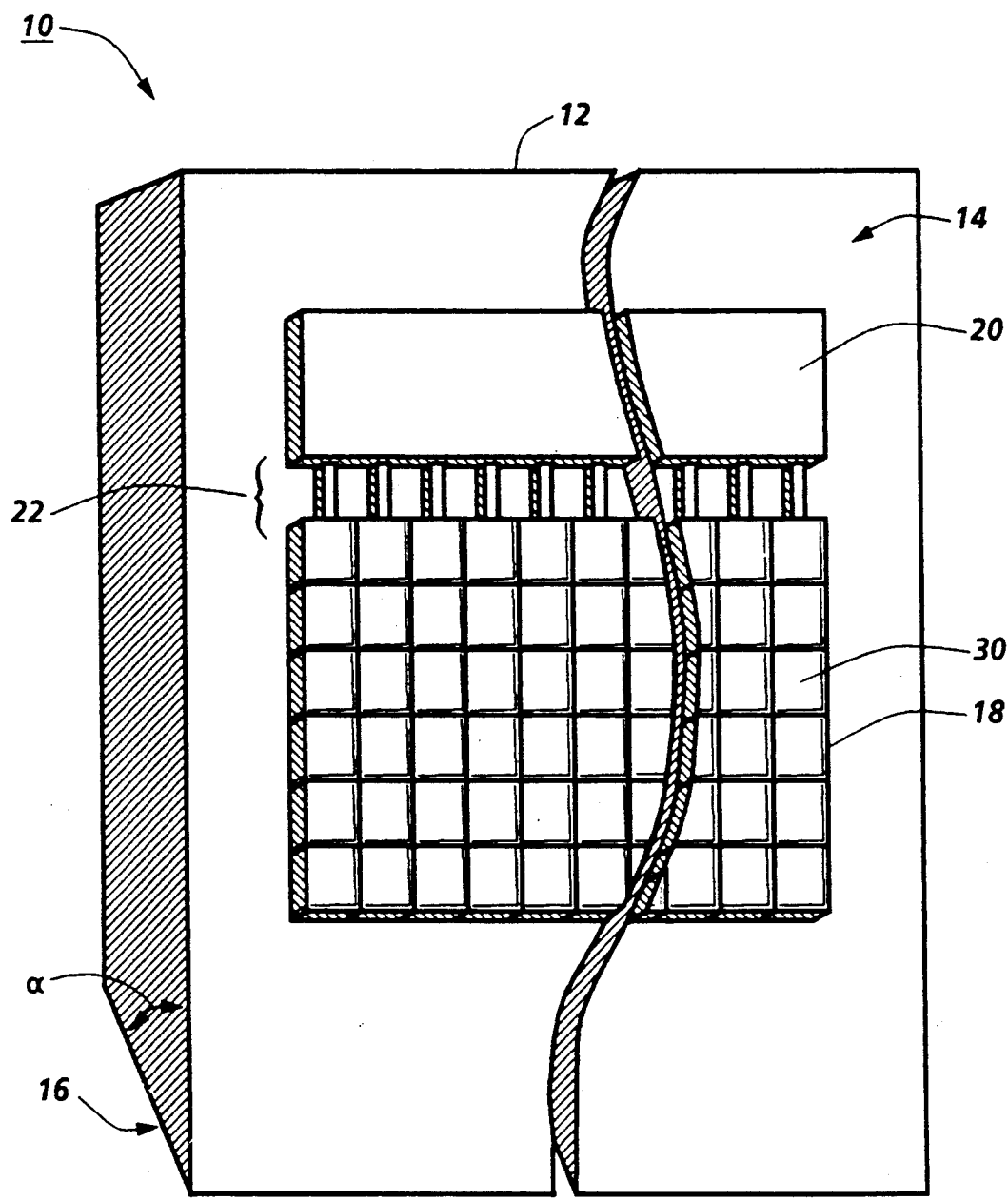
FIG. 1 shows a perspective view of an integral spectral resolving and sensing apparatus employing sensing apparatus according to the present invention.
Figure 2:
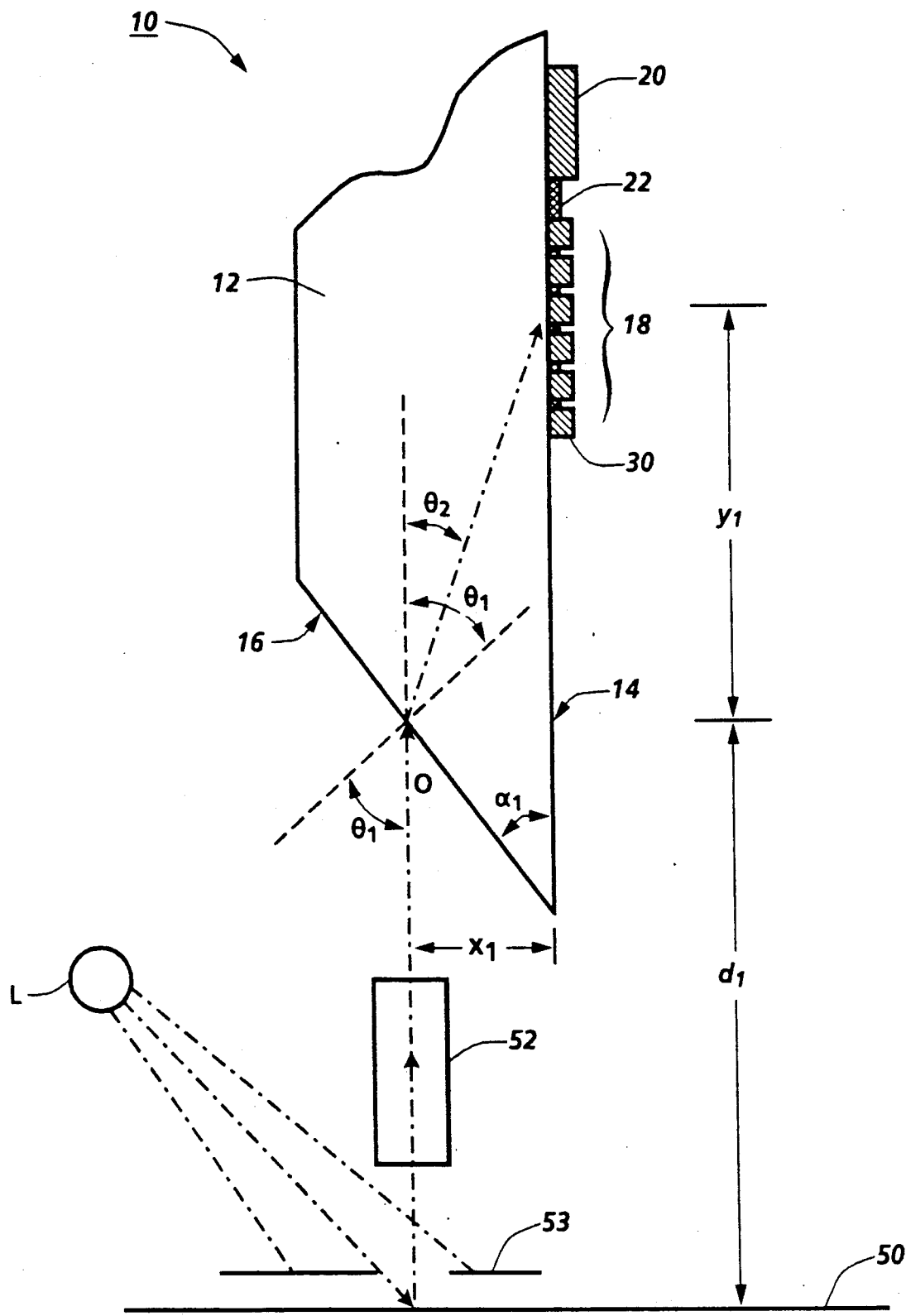
FIG. 2 shows a profile view of an integral spectral resolving and sensing apparatus employing sensing apparatus according to the present invention.

FIGS. 1 and 2 show a typical spectral resolving apparatus 10 in which the variable detector geometry of the present invention may be employed. As between the various figures, like reference numerals refer to like elements of the described embodiments. Apparatus 10 includes a substrate 12 preferably of glass or similar suitably optically transparent material, such as Corning 7059 manufactured by the Corning Glass Company, fused silica material, or the like upon which small-scale integrated circuitry may be formed. Substrate 12 will be of sufficient quality that it should be free of internal imperfections of wavelength magnitude. Similarly, it should be free of external imperfections of wavelength magnitude. It should also be flat relative to its thickness so that transmitted images will not be distorted. Substrate 12 will preferably be colorless, although compensation may be made for the color of the substrate as discussed below. Substrate 12 is formed to have two surfaces of particular configuration and orientation, planar primary surface 14, and adjacent planar secondary surface 16. Secondary surface 16 is beveled relative to primary surface 14 such that the angle $\alpha$ between the two surfaces is less than 90° as shown more clearly in FIG. 2. The angle $\alpha$ will be selected in accordance with the selected placement of a detector array and other selected circuitry on primary surface 14 as discussed in further detail below.

Formed on primary surface 14 of substrate 12 will be detector array 18 composed of individual detectors 30, discussed in further detail below. The formation of detector array 18 may be by semiconductor processing steps well known in the art. Detector array 18 will be at least in part composed of a semiconductive material such as silicon, germanium, alloys of these and other materials, etc. Specifically, it is desirable to produce relatively large width devices, on the order of 8 inches or more, to enable scanning an entire page width without need for corrective optics, motion of the sensors, etc. A convenient material from which to fabricate the microelectronics of the present invention is amorphous silicon (a-Si:H) due to its particular applicability to large area circuitry and fabrication onto substrates such as glass at relatively low temperatures.

Also formed on primary surface 14 of substrate 12 will be logic and select circuitry 20. The formation of logic and select circuitry 20 will also preferably be by semiconductor processing steps known in the art. Specifically, logic and select circuitry 20 will be formed by similar processes as and in conjunction with the formation of detector array 18. Electrical interconnection 22 is formed also by similar processes as and in conjunction with the formation of detector array 18 on primary surface 14 connecting detector array 18 and logic and select circuitry 20. It will now be appreciated that the complete scanning electronics are formed of similar materials and by similar processing steps upon a substrate which is capable of functioning as a means for resolving a polychromatic image. Thus, a compact, self contained scanning head of the type employed in document scanners and the like may be simply and conveniently formed by fabrication techniques known in the art.

Physical operation of the spectral resolving and sensing apparatus 10 is illustrated in the profile view of FIG. 2. Apparatus 10 will be positioned proximate an object to be scanned, which may, for example, be an image bearing document 50. An illumination source L will be positioned to illuminate a portion of the document 50 to be scanned. Illumination source L will preferably be uniformly polychromatic, although compensation may be made for nonuniformity as discussed below. Located between apparatus 10 and document 50 will be focussing means 52, such as a fiber array lens of the type produced by Nippon Sheet Glass (Japan) under the name SelFoc lens. The SelFoc lens is a preferred focussing means since it is available in page widths such as 8 inches or more. By using such lenses with the present apparatus, full page width scanners may conveniently be produced.

The distance $d_1$ between the image receiving region of secondary surface 16 and document 50 will be determined by the material selected for substrate 12, the angle of incidence $\theta_1$ of object line O, which represents the center of the focal plane of the source image, and the focal length of focussing means 52. The distance $d_1$ may be on the order of several centimeters or more. Optical path control (not shown) well known in the art may also be employed to produce a compact scanning device as application of the present invention dictates.

Location and orientation of the individual detectors 30 is determined as follows from two governing principles. The first is refraction of light as it passes from a first medium having a first index of refraction $n_1$ to a second medium having a second index of refraction $n_2$. This principle is realized by Snell's law which states that the angle of incidence $\theta_1$ is related to the angle of refraction $\theta_2$ by $$n_1 \sin \theta_1 = n_2 \sin \theta_2 \tag{1}$$

From the geometry of the device of FIG. 2 the relationship between the angles of incidence and refraction and the horizontal and vertical distances, x and y, of the optical path can be derived as $$x/y = \tan(\theta_1 - \theta_2) \quad (2)$$

The second principle is that the indices of refraction of certain media, such as glass, vary smoothly as a function of wavelength over the visible region of the spectrum. Prisms function due to the fact that the index of refraction of the materials from which they are formed is higher for shorter wavelengths. Specifically, the spatial separation of blue to red light is on the order of 0.005 times the average path length for glass. By combining expressions (1) and (2) a relationship may be established between the angle of incidence, horizontal and vertical path lengths, and the index of refraction of the substrate $$y = x/\tan[\theta_1 - \sin^{-1}(\sin\theta_1/n_2)] \quad (3)$$

This relationship may then be used to calculate the vertical location y of the centroids of elements of the detector array 18 such that light of selected wavelengths fall on the selected detectors. An arbitrary number of wavelengths have been selected for calculation of y for the device of FIG. 2. The results of these calculations are shown in Table 1. Two different substrate materials, fused silica and the aforementioned Corning 7059 product, have been considered for illustration purposes. For the purposes of sample calculations, x has been taken as 1 mm, and $\theta_1$ has been taken to be 10°.

It should be noted from Table 1 that the difference between successive y values for the various wavelengths used for sample calculations is greater than the device size capable of being produced by the aforementioned processes. Thus, it is possible to resolve and detect at least the above wavelengths from a polychromatic source image, and in fact it is possible to resolve and detect even smaller increments of wavelengths. This points out that the present limitation on the detectable resolution of a spectral resolving and sensing apparatus according to the present invention is the center to center spacing of the elements of the detector array.

TABLE 1

| Wavelength (nm) | Fused Silica | | Corning 7059 | |
|---|---|---|---|---|
| | Index of refraction | location of centroid y (μm) | Index of refraction | location of centroid y (μm) |
| 404 | 1.46968 | 17806 | * | * |
| 480 | * | * | 1.5391 | 16248 |
| 546 | * | * | 1.5347 | 16335 |
| 589 | 1.45845 | 18102 | 1.5326 | 16377 |
| 643 | * | * | 1.5305 | 16419 |
| 706 | 1.45517 | 18191 | * | * |

Figure 3A:
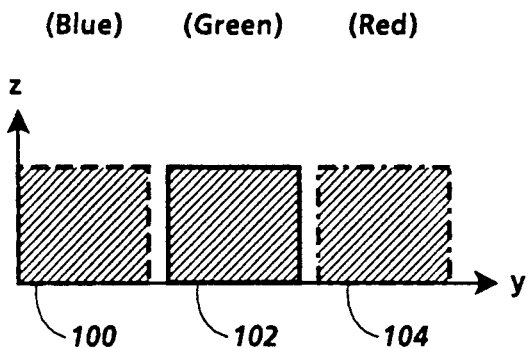
FIGS. 3a and 3b show one embodiment of sensors and corresponding sensitivity curves, respectively, according to the present invention.

Referring now to FIG. 3a, one embodiment of sensors according to the present invention is shown. According to this embodiment, three sensors 100, 102, and 104 are shown, each with a roughly rectangular planform. Sensor 100 will be positioned per the above formulation to coincide with the location of the resolved blue light (e.g., to sense incident light in the band of wavelengths around 4550 to 4920 Å corresponding to the blue portion of the spectrum). Likewise, sensor 102 will be positioned to coincide with the location of the resolved green light (wavelengths around 4920 to 5770 Å) and sensor 104 will be positioned to coincide with the location of the resolved red light (wavelengths around 6220 to 7700 Å).

Detectors 30 (FIGS. 1 and 2) according to the present invention may be one of a variety of configurations, such as p-i-n or Schottky-barrier photodiodes. For such devices held under zero or reverse bias, and uniformly illuminated, the current passed by the device as a function of illumination (hereinafter referred to as "photocurrent" or, as in FIGS. 3a through 7a, "P") is proportional to the device area. Another effective configuration is the gap cell photoconductor structure described in U.S. Pat. No. 4,646,163 to Tuan et al., which is fully incorporated by reference herein. In general it is known that when light falls on a photosensor of the above types its resistance is lowered and current is allowed to flow therethrough. This photoconductivity is directly proportional to the number of photons incident on the surface of the photodetector. Thus, photoconductivity and hence, under fixed voltage bias, the photocurrent, are also directly proportional to the surface area of the photodetector.

Figure 3B:
Figure 4A:
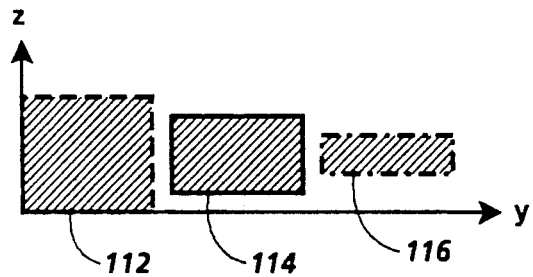
FIGS. 4a and 4b show another embodiment of sensors and corresponding sensitivity curves, respectively, according to the present invention.
Figure 4B:
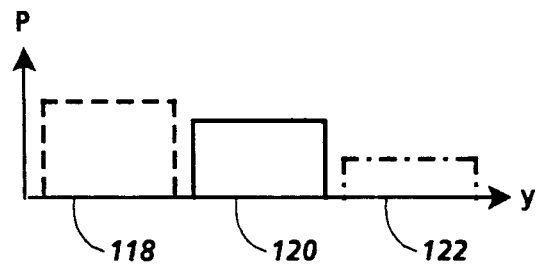

Referring to FIG. 3b, a plot of the photocurrent (P) on the ordinate versus position of a line illuminant (y) along one direction on a sensor on the abscissa for an ideal sensor is shown. Hereafter such a plot will be referred to as a sensitivity curve. For the generally rectangular shaped sensor 100, oriented as shown, the photocurrent will be uniform across the sensor and the sensitivity curve will be as shown at 106 in FIG. 3b. Likewise, curves 108 and 110 correspond to sensors 102 and 104, respectively.

Figure 5A:
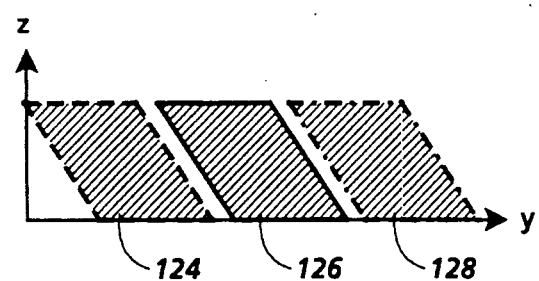
FIGS. 5a and 5b show yet another embodiment of sensors and corresponding sensitivity curves, respectively, according to the present invention.
Figure 5B:
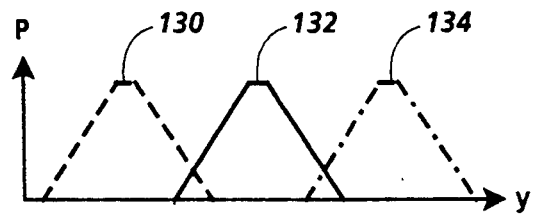

This effect is further illustrated in FIGS. 4a, 4b, 5a, and 5b. For example, comparing equally illuminated sensors 112, 114, and 116 of FIG. 4a to the corresponding sensitivity curves 118, 120, and 122 of FIG. 4b, respectively, it will be noted that as the width z(y) of the sensor decreases, so does the conductivity of the sensor when illuminated along a set line y. Referring to FIGS. 5a and 5b, it will be noted that with proper selection of the sensor shape and location, arbitrary conductivity responses may be approximated.

When these sensors having preselected geometry and position are incorporated into the integral spectral resolving and sensing apparatus described above (or similar apparatus), the y direction along the sensor (abscissa) is equivalent to wavelength of resolved light. The sensitivity curves then indicate change in conductivity versus wavelength (i.e., indicate the extent of each color of light falling upon the resolving means). In this way, the geometry and position of the sensors may be used to effect sensing of selected components of light incident upon the resolving means, in effect simulating filtering of the incident light. This sensor-based approach obviates many if not all of the disadvantages of filtering, such as reduced available light intensity, heating, relatively large size, etc.

Figure 6A:
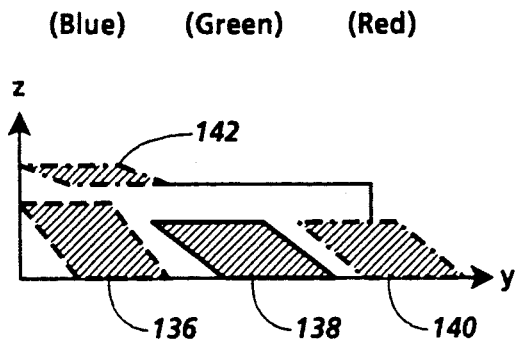
FIGS. 6a, 6b, and 6c show an embodiment of sensors, and corresponding sensitivity curves, together with corresponding schematic representations of the sensors, respectively, according to the present invention.
Figure 6B:
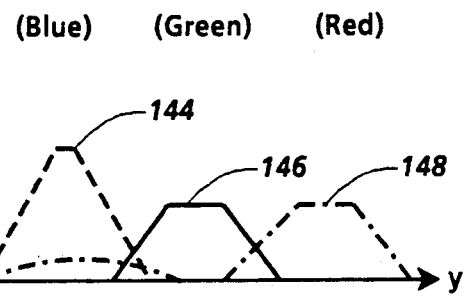

In each of the above-mentioned embodiments, it has been assumed that a uniform polychromatic illumination source L has been used. It was also assumed that the substrate was clear in color. Either or both of these may not be the case, and compensation for their effect on the color of the source image would be required. Compensation for these effects could be performed by selection of proper geometry and position of the sensors. For example, if the illumination source is too rich in red light, the sensors corresponding to the red end of the spectrum can be made proportionately smaller (compare FIGS. 3a and 4a). Overlapping spectral sensitivity of bands can be accomplished geometrically as well, as shown in FIGS. 6a and 6b. In general, the spectral response of a photodiode or photoconductor (photocurrent per unit area divided by incident illumination intensity) is dependent on the materials and internal construction of the device itself. Compensation for these effects can be performed in a similar fashion. In fact, virtually all wavelength-based effects (such as the material-dependent photodiode spectral response) of the resolving and sensing apparatus and illumination source may be compensated for or controlled in like fashion.

Figure 6C:
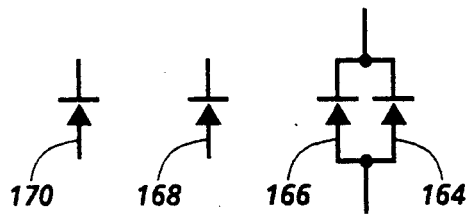

Geometric compensation may also have a special application when the goal is to have the sensor array mimic a selected response, such as the CIE color standard or the human eye's tristimulus values. Experiments in which humans are asked to match colors by mixing three colored light sources have produced "tristimulus color-matching curves," as shown in FIG. 6b, which are used to define colors in the so-called CIE (X, Y, Z)-system standard. These three curves are not single-peaked; in fact the red curve 148 of FIG. 6b has a small peak in the blue end of the spectrum. A geometric sensor implementation of this scheme connects an extra photosensor in the blue in parallel to the red sensor, as shown in FIG. 6a. Schematically, this is shown in FIG. 6c as parallel diodes 164 and 166. The schematic representations of FIG. 6c correspond to the symbology of FIG. 8 in that where a sensor is of the type shown at 140 and 142 in FIG. 6a, for example, its schematic representation in both FIG. 6c and the circuit of FIG. 8 will be parallel diodes.

Figure 7A:
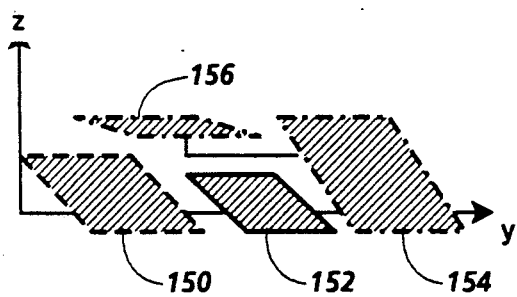
FIGS. 7a, 7b, and 7c show another embodiment of sensors, and corresponding sensitivity curves, together with corresponding schematic representations of the sensors, respectively, according to the present invention.
Figure 7B:
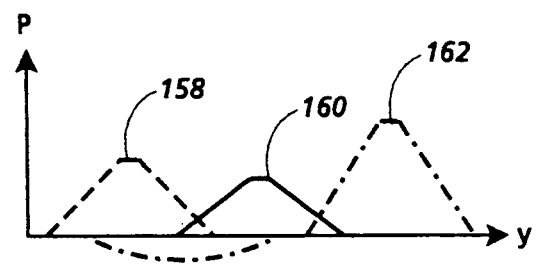
Figure 7C:
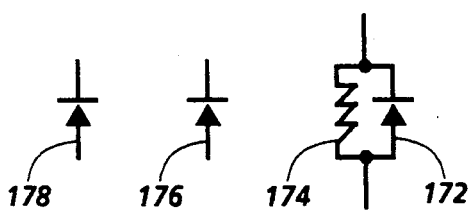

In the human eye, the unusual effect of color inhibition is sometimes observed: for example, the presence of blue illumination might inhibit the sensitivity of the red sensor to red light. This is illustrated in FIG. 7b. In the embodiment where the sensors are photodiodes, placing a small photoconductor connected to the red sensor in a position where blue light will hit it which decreases in electrical resistance when illuminated will allow modelling of this effect. The physical layout of such a device is shown in FIG. 7a, and a schematic representation of such a device, including a photodiode 172 and a photoresistor 174, is shown in FIG. 7b. Again, the schematic representations of FIG. 7c correspond to the symbology of FIG. 8.

Figure 8:
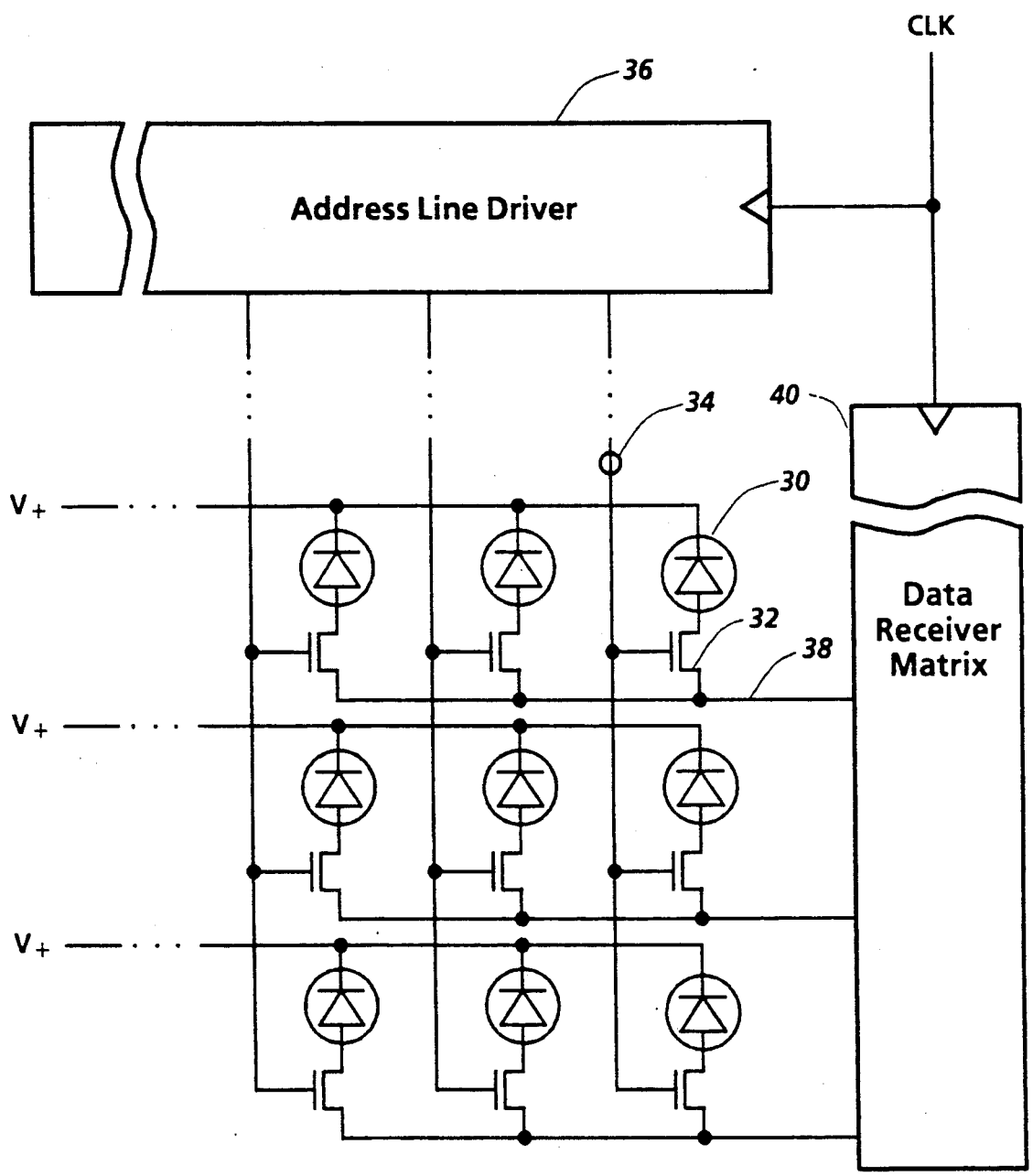
FIG. 8 shows a schematic illustration of a detector circuit which may be utilized with various aspects of the present invention.

In order that the simplicity of the resolving and sensing apparatus be carried through into the circuitry of detector array 18 and logic and select circuitry 20, an arrangement such as that shown in FIG. 8 may be utilized. The detailed operation of the circuit of FIG. 8 is discussed in further detail in the incorporated patent application entitled Spectral Resolving and Sensing Apparatus.

The above-described operation of the spectral resolving and sensing apparatus including the variable detector geometry and positioning according to the present invention details several important advantages over the prior art. First, the response of arbitrary filtering of a resolved image may be simulated without losses typically associated with prior art filters. Second, processing of the response may be achieved without additional circuitry for such processing. Third, a greater than heretofore available number of wavelength components may be detected due to the small scale of the detectors and the lack of discrete filtering elements.

In general, to those skilled in the art to which this invention relates, many changes in construction and widely differing embodiments and applications of the present invention will suggest themselves without departing from its spirit and scope. For example, the sensors shown and described herein have primarily parallelogram, rectangular or square planforms. However, the sensors may be shaped in any geometrical configuration appropriate to the particular application of the present invention.

Furthermore, the above description has been from the point of view of a color scanner operating in the visible light range. The invention herein described and claimed is equally applicable outside the visible light region of the electromagnetic spectrum. For example, by properly positioning the detectors of any of the aforementioned configurations it is possible to detect wavelengths shorter or longer than the visible light region. The factors limiting the detectable wavelengths will be the detector size on the short wavelength end and overall device size on the long end. Thus, the disclosures and descriptions herein are illustrative, and are not intended to be in any sense limiting.

What is claimed is:

1. An apparatus for resolving and sensing an electromagnetic signal, the electromagnetic signal comprised of at least one wavelength component, the apparatus comprising:
    a resolving means which resolves the electromagnetic signal such that the at least one wavelength component is projected to a predetermined location which is a function of that wavelength component; and
    at least one sensing means positioned at said predetermined location for sensing the presence of the at least one wavelength component, the at least one sensing means being of a predetermined shape and size such that a selected filter response is approximated by the response characteristics of the sensing means.

2. An apparatus for resolving and sensing an electromagnetic signal, the electromagnetic signal comprised of a plurality of wavelength components, the apparatus comprising:
    a resolving means which resolves the electromagnetic signal such that the components of the electromagnetic signal having different wavelengths are spatially separated from one another and projected to predetermined locations, each location being a function of each wavelength component; and
    a plurality of sensing means positioned at predetermined locations for sensing the presence of selected wavelength components, each sensing means being of a predetermined shape and size such that a selected filter response is approximated by the response characteristics of the sensing means.

3. The apparatus of claim 2, wherein the resolving means includes an optically transparent body through which the electromagnetic signal is passed such that the electromagnetic signal is refracted thereby to resolve the electromagnetic signal into a continuum of constituent wavelengths, and further wherein the sensing means are positioned, shaped, and sized so as to compensate for any color distortion imparted by the optically transparent body.

4. The apparatus of claim 2, wherein the sensing means are shaped and sized such that three resultant output signals output from the sensing means correspond to the CIE tristimulus response of the human eye.

5. The apparatus of claim 2, wherein said sensing means are photodiodes, and at least one of said sensing means further includes a region of material whose resistivity varies as a function of light incident thereon, positioned beyond said sensing means' predetermined position in order to sense the presence of selected wavelengths other than the wavelengths selected to be sensed by said at least one of said sensing means, to approximate color inhibition.

6. An apparatus for resolving and sensing an electromagnetic signal, the electromagnetic signal comprised of a plurality of wavelength components, the apparatus comprising:

a transparent substrate having a first surface and a second surface, the second surface characterized in that the electromagnetic signal incident thereupon at an angle of incidence is caused to enter the substrate and in so doing each of the wavelength components of the electromagnetic signal subtending a different angle from the angle of incidence, thereby separating the electromagnetic signal into its spectral components such that they pass through the substrate and strike the first surface at spatially separated locations; and sensing means formed on said first surface and positioned, shaped, and sized such that a selected filter response is approximated by the response characteristics of the sensing means.

7. The apparatus of claim 6, wherein said sensing means are photolithographically formed solid state photoreceptors, and further wherein logic and select circuitry is formed on said first surface by substantially the same photolithographic processes as and substantially simultaneously with the formation of said solid state photoreceptors.

* * * * *